(12) United States Patent
Niesner

(10) Patent No.: US 11,298,894 B2
(45) Date of Patent: Apr. 12, 2022

(54) METHOD AND DEVICE FOR PRODUCING A FIBER-REINFORCED PLASTIC COMPONENT

(71) Applicant: Bayerische Motoren Werke Aktiengesellschaft, Munich (DE)

(72) Inventor: Bruno Niesner, Essenbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 333 days.

(21) Appl. No.: 16/680,095

(22) Filed: Nov. 11, 2019

(65) Prior Publication Data

US 2020/0079036 A1 Mar. 12, 2020

Related U.S. Application Data

(63) Continuation of application No. PCT/EP2018/056514, filed on Mar. 15, 2018.

(30) Foreign Application Priority Data

May 24, 2017 (DE) ..................... 10 2017 208 870.2

(51) Int. Cl.
*B29C 43/02* (2006.01)
*B29C 70/48* (2006.01)

(52) U.S. Cl.
CPC .................................. *B29C 70/48* (2013.01)

(58) Field of Classification Search
CPC .................................................... B29C 70/48
See application file for complete search history.

(56) References Cited

U.S. PATENT DOCUMENTS

| 3,028,284 A | 4/1962 | Reeves |
| 3,137,750 A | 6/1964 | Gringras |
| 5,040,962 A | 8/1991 | Waszeciak et al. |
| 6,761,847 B2 | 7/2004 | Meggiolan |
| 7,172,408 B2 | 2/2007 | Wood et al. |

(Continued)

FOREIGN PATENT DOCUMENTS

| CN | 1370693 A | 9/2002 |
| CN | 1473103 A | 2/2004 |
| CN | 104175575 A | 12/2014 |

(Continued)

OTHER PUBLICATIONS

Machine translation of JP-0607680 A "modling method for thermosetting resin compound", publication date Mar. 15, 1994.*

(Continued)

*Primary Examiner* — Jeffry H Aftergut
*Assistant Examiner* — Jaeyun Lee
(74) *Attorney, Agent, or Firm* — Crowell & Moring LLP

(57) ABSTRACT

A method for producing a fiber-reinforced plastic component includes inserting a fiber preform, which is arranged on a fluid-filled hollow core, in a mold that has at least two mold parts, closing the mold, the fiber preform and the hollow core being received in a mold cavity defined by the at least two mold parts, filling the cavity with a plastic material and curing the plastic material in the closed, heated mold. The internal pressure in the mold is measured during the curing of the plastic material and the distance between the at least two mold parts is increased when the pressure exceeds an upper threshold value.

9 Claims, 2 Drawing Sheets

(56) References Cited

U.S. PATENT DOCUMENTS

2002/0038923 A1* 4/2002 Lenherr ................. B29C 33/52
  264/221
2016/0059500 A1 3/2016 Hosokawa et al.

FOREIGN PATENT DOCUMENTS

| | | | |
|---|---|---|---|
| CN | 104736324 A | 6/2015 | |
| CN | 106739011 A | 5/2017 | |
| DE | 10 2007 027 755 A1 | 12/2008 | |
| DE | 10 2011 051 391 A1 | 12/2011 | |
| DE | 10 2014 201 380 A1 | 7/2015 | |
| DE | 10 2014 005 847 A1 | 10/2015 | |
| DE | 10 2014 012 323 A1 | 2/2016 | |
| DE | 10 2014 215 965 A1 | 2/2016 | |
| ES | 2 064 594 T3 | 2/1995 | |
| JP | 06071680 A * | 3/1994 | ............ B29C 33/40 |
| JP | 2007-190854 A | 8/2007 | |

OTHER PUBLICATIONS

PCT/EP2018/056514, International Search Report dated Aug. 3, 2018 (Three (3) pages).
German Office Action issued in German counterpart application No. 10 2017 208 870.2 dated Nov. 6, 2017 (Four (4) pages).
Chinese Office Action issued in Chinese application No. 201880017144.4 dated Jan. 5, 2021, with English translation (Eighteen (18) pages).

* cited by examiner

METHOD AND DEVICE FOR PRODUCING A FIBER-REINFORCED PLASTIC COMPONENT

CROSS REFERENCE TO RELATED APPLICATIONS

This application is a continuation of PCT International Application No. PCT/EP2018/056514, filed Mar. 15, 2018, which claims priority under 35 U.S.C. § 119 from German Patent Application No. 10 2017 208 870.2, filed May 24, 2017, the entire disclosures of which are herein expressly incorporated by reference.

BACKGROUND AND SUMMARY OF THE INVENTION

The invention relates to a method and to a device for producing a fiber-reinforced plastic component, in particular a fiber-reinforced plastic component comprising a cavity.

Among the methods used to produce hollow fiber-reinforced plastic components are "RTM" (resin transfer molding) and vacuum injection. In these methods, at least one layer of reinforcing fibers, preferably aligned unidirectionally or bidirectionally, is applied to a supporting core, which, as a negative mold, reproduces the internal contour of the hollow fiber-reinforced plastic component. This unit comprising a supporting core and reinforcing fibers is then placed in a mold, which, as a negative mold, reproduces the external contour of the fiber-reinforced plastic component. By injecting a curable plastic, e.g., a system consisting of epoxy resin and a curing agent, the interspace between the supporting core and the mold, in which the fiber layer is furthermore situated, is filled and the fiber layer is impregnated, resulting in the formation, after curing, of a plastic component consisting of a plastic matrix with embedded reinforcing fibers. Whereas, in the RTM method, the plastic is injected under pressure into the cavity between the supporting core and the mold, the vacuum injection method involves producing a vacuum, by means of which the plastic is sucked into the cavity.

For reasons of weight, the supporting cores are often designed as hollow cores. To improve the stability of these hollow cores, there is a known practice of filling them with a fluid, e.g., compressed air or water. In this regard, attention is drawn to DE 10 2007 027 755 A1.

During the curing of the plastic compound, the mold is heated, as a result of which the hollow core is also heated. The fluid in the hollow core expands. The resulting increased internal pressure in the mold results in a good surface finish on the finished fiber-reinforced component. However, the internal pressure can assume very high values in the region of up to 200 bar. Both the cores and the pressure molds must be designed for these high pressures, and this makes the systems expensive and the process complex.

It is therefore the object of the present invention to indicate a way of enabling the disadvantages described above to be reduced.

A method for producing a fiber composite component is indicated in which a fiber preform, which is arranged on a hollow core filled with fluid, is inserted into a mold. The mold comprises at least two mold parts. The mold is closed, wherein the hollow core together with the fiber preform are received in a cavity formed by the mold parts. The cavity is filled with a plastic material, and the plastic material is cured in the closed and heated mold.

As a negative mold, the hollow core reproduces the internal contour of the plastic component to be formed. For reasons of weight, the hollow core has a relatively thin wall, the stability of which is sufficient to ensure that the hollow core is of sufficient dimensional stability in the no-load state. The hollow core can be produced from a thermoplastic by blowmolding, for example. To achieve the necessary stability, the hollow core is filled with a fluid. The fluid can be a gas or a liquid, e.g., water.

During curing, the temperature regulation of the mold also causes the hollow core with the fluid filling contained therein to heat up. There is a pressure rise within the hollow core and consequently a pressure rise within the closed mold.

According to the invention, the internal pressure in the mold is measured during the curing of the plastic material. If a predetermined upper limit value is exceeded, the distance between the mold parts is increased.

This solution is based on the realization that, owing to the different surface ratios of the cavity and the hollow core, even a slight opening of the mold is sufficient to dissipate pressure peaks. Surprisingly, the required opening of the mold is so small that the final contour of the component remains within acceptable tolerances.

By avoiding uncontrolled high internal pressures, it is possible to use conventional RTM systems. The mold and the closing unit by means of which the mold is closed need only be dimensioned for standard pressures.

In a preferred development of the invention, provision is made not only to prevent the formation of an excessive internal pressure but to regulate the internal pressure in the mold during the curing of the plastic material by changing the distance between the mold parts. In particular, the internal pressure is kept within a predetermined pressure range by the regulation. To be more precise, the distance between the mold parts is increased or reduced to keep the internal pressure in the pressure range. It is thereby possible to achieve an optimum surface finish on the finished component while simultaneously reducing stresses on the mold.

Since the internal pressure is compensated by a movement of the mold, it is not necessary to change the filling quantity in the hollow core to circumvent excessive pressure stresses. In one embodiment, provision can therefore be made for the hollow core filled with the fluid to be closed in a fluidtight manner, at least during the curing of the plastic material. Hollow cores of this kind can be produced in a particularly simple and advantageous manner. It is possible to dispense with complex filling systems, by means of which the filling quantity and hence the pressure in the hollow core can be varied during curing.

In particular, it is possible to use a hollow core which is closed permanently in a fluidtight manner and the filling opening of which is welded, for example, after filling. After the curing of the plastic material, the permanently closed core is destroyed, enabling the fluid to escape.

To compensate for the pressure change, it is sufficient if the distance between the mold parts is changed slightly. In one embodiment, the distance between the mold parts is varied in a range of only 0 to 4 mm during curing, i.e., the difference between a maximum and a minimum distance at which the mold parts are positioned relative to one another during the curing of a component is no more than 4 mm.

The internal pressure in the mold is advantageously measured directly at a mold inner wall facing the mold cavity. The pressure can be measured at just one point or at several points, wherein the internal pressure obtained is determined by averaging all the measured internal pressures, for example.

A fluid resin/curing agent system which cures under pressure and temperature in the mold component is preferably used as the plastic compound.

The fiber preform can be a single- or multi-ply non-crimp or warp- or weft-knitted fabric or the like, for example. In particular, the fiber preform can be wound around the hollow core as a braid.

By means of the method, it is advantageously possible to produce hollow fiber-reinforced plastic components of complex shape. In one embodiment, the method is used to produce a vehicle component and, in particular, a body component.

In another aspect of the invention, a device for producing a fiber-reinforced plastic component using a fluid plastic compound and a fiber preform is specified. The device comprises a mold that has at least two mold parts. The mold parts are arranged in a closing unit. The mold parts can be moved relative to one another between an open position and a closed position by the closing unit. In the closed position, the mold parts enclose a cavity, in which a fiber preform formed around a core can be arranged. The device furthermore comprises at least one actuating means, by means of which the distance between the mold parts can be changed by moving at least one mold part. The closing units with actuating means can be formed by a press, for example, in which the mold is arranged, wherein the mold can be opened and closed by a movement of the press ram.

According to the invention, the device furthermore has at least one pressure measuring means, by means of which the internal pressure in the cavity can be detected, as well as a control device. The pressure measuring means can be a pressure sensor, for example, and can be embodied as a piezoelectric detector or diaphragm detector or the like, for example. It is, of course, possible to provide a plurality of pressure measuring means in order to measure the internal pressure simultaneously at several points, for example. The control device is designed to actuate the actuating means in order to increase a distance between the mold parts if the measured internal pressure exceeds a predetermined limit value. The control device can furthermore also be designed as an evaluation device for evaluation of the detected internal pressure.

In a preferred embodiment, the control device is furthermore designed to control the actuating means in such a way that the internal pressure arising in the mold can be regulated in accordance with the measured internal pressure by changing the distance between the mold parts. For example, the control device brings about slight opening of the mold by increasing the distance between the mold parts if the measured internal pressure exceeds an upper limit value and, conversely, brings about slight closure of the mold by reducing the distance between the mold parts if the measured internal pressure falls below a predetermined lower limit value.

This device can be integrated into an existing RTM system by simple and inexpensive means. In particular, the stored-program controller of an existing system can also perform the function of the control device described above. By virtue of the selective limitation or regulation of the internal pressure, conventional RTM presses can be used.

The properties, features and advantages of this invention which are described above as well as the manner in which these are achieved will be more clearly and distinctly understood from the drawings and in combination with the following description of the illustrative embodiments. Where the term "can" is used in this application, this is a matter both of the technical possibility and the actual technical implementation.

Illustrative embodiments are explained below with reference to the attached drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
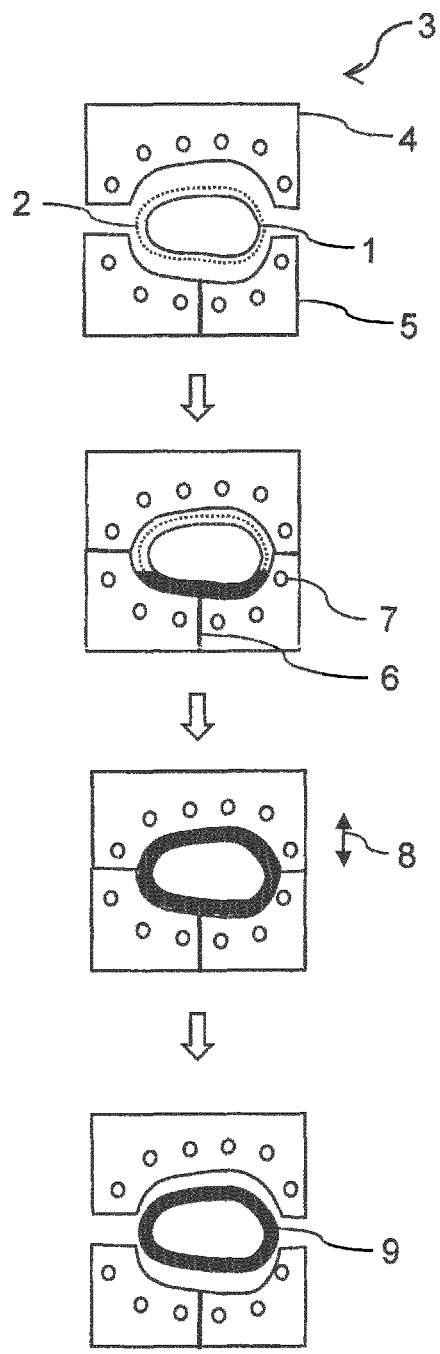
FIG. 1 shows the essential method steps of a method according to the invention in a schematic view.

In the method, a preferably thermoplastic hollow core 1 is first of all made available. As a negative mold, the hollow core 1 reproduces the internal contour of the component to be produced. The hollow core 1 has a relatively thin wall, which is dimensioned in such a way that the hollow core 1 is of sufficient dimensional stability in the no-load state. The hollow core 1 is filled almost completely with a fluid, and, in the present case, the hollow core is filled to at least 98% with water. After filling, the hollow core 1 is closed fluid-tightly.

Arranged around the hollow core 1 is a fiber preform 2, fibers preferably being wound around the hollow core 1 for this purpose. By virtue of the filling, the hollow core 1 has sufficient dimensional stability to ensure that the winding, which is carried out with a relatively high tensile stress, does not lead to any significant change in the shape of the hollow core 1.

The hollow core 1 provided with the fiber preform 2 is placed in an RTM mold 3, the cavity of which reproduces the external contour of the fiber-reinforced plastic component to be produced. After the closure of the RTM mold 3, which comprises two mold parts 4, 5, a system consisting of epoxy resin and curing agent is injected by means of a filling system 6 into the interspace between the hollow core 1 and the mold 3 at a pressure of up to 80 bar.

The plastic matrix is cured by heating the RTM mold 3, for which purpose a correspondingly temperature-regulated liquid is passed through heating tubes 7. The heating of the RTM mold 3 also causes the hollow core 1 and the fluid enclosed therein to heat up, as a result of which it expands. This results in an increasing internal pressure for the curing fiber-reinforced component and the closed mold 3.

In principle, an increased internal pressure during the curing phase produces an improved surface finish on the finished component. According to the invention, this internal pressure is now prevented from rising in an uncontrolled manner and reaching values which could damage the component or the mold.

According to the invention, the internal pressure in the mold is detected for this purpose. If the internal pressure exceeds a predetermined upper limit value during the curing phase, the upper mold 4 is moved away from the lower mold 5. Just a slight movement of the mold of no more than 4 mm is sufficient here for a significant reduction in the internal pressure. Owing to the slight opening of the mold, the volume within the mold is increased and the internal pressure is reduced. If the internal pressure falls below a predetermined lower limit value, the mold is closed further again (in an extreme case completely closed again). The slight movement of the mold is indicated by the arrow 8 in FIG. 1. This feed motion of the mold to regulate the internal pressure is preferably continued during the entire curing process, thus regulating the internal pressure.

After the full curing of the plastic matrix, the RTM mold 3 is opened, allowing the fiber-reinforced plastic component 9, including the hollow core, to be removed. Emptying the hollow core can take place simultaneously, for example, if an opening is introduced into the component 9 and the hollow core and air is blown into the hollow core under high pressure, thereby displacing the water in the hollow core.

Figure 2:
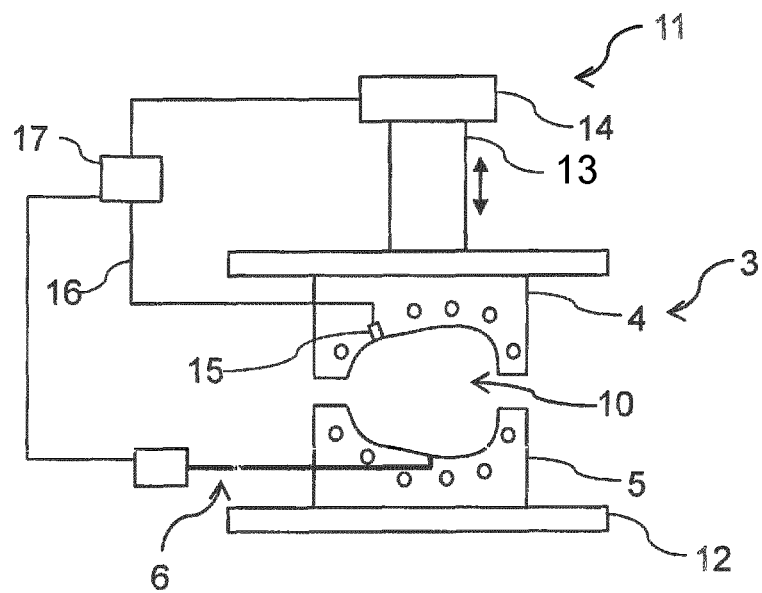
FIG. 2 shows an illustrative device according to the invention for producing a fiber composite component.

FIG. 2 shows an illustrative device for producing a fiber-reinforced plastic component of the kind that can also be used in the method described with reference to FIG. 1. The device comprises a mold 3 that has two mold parts 4, 5. The mold 3 is designed as an RTM mold, having an upper mold 4 and a lower mold 5. In the closed state, there remains between the upper and the lower mold a cavity 10 which reproduces the external contour of the component to be produced. The cavity 10 is configured in such a way that the hollow core 1 with the fiber preform 2 arranged thereon can be arranged in the cavity.

The mold parts 4, 5 are arranged in a closing unit 11 in the form of a press, by which they can be moved relative to one another between an open position and a closed position. In addition to a press table 12 and a press ram 13, the closing unit has an actuating means 14, by means of which the press ram 13 can be moved toward the press table 12, thereby enabling the distance between the mold parts 4, 5 to be changed. If this is a hydraulic press, for example, the actuating means 14 is designed as a hydraulic pump, for example.

To measure the internal pressure in the cavity 10, the device furthermore comprises a pressure measuring means 15 in the form of a pressure sensor. The pressure sensor is arranged on the inner wall of the upper mold 4 and is connected to a control and evaluation device 17 by a signal line 16.

The control and evaluation device 17 is designed to evaluate the measured internal pressure and to compare it with a predetermined limit value. If a predetermined upper limit value is exceeded, the control device 17 controls the actuating means 14 in such a way that the distance between the mold parts 4, 5 is increased slightly.

A control circuit is preferably provided in the control device 17; in this way, the control device controls the actuating means 14 in such a way that the internal pressure in the mold 3 is regulated in accordance with the measured internal pressure by changing the distance between the mold parts 4, 5. The stored-program controller (SPC), by means of which the closing and opening of the mold as well as the pressing of the plastic compound into the mold is also subjected to open-loop and closed-loop control, can preferably be used as the control device 17. The control device has a corresponding operative connection.

It is also possible to use a plurality of measurement points to measure the pressure.

By means of the solution according to the invention, excessive stress on the mold and uncontrolled extrusion of the plastic matrix from the mold are reliably avoided. The solution according to the invention can be integrated easily and inexpensively into existing systems, e.g., RTM systems, and can therefore be implemented inexpensively. Moreover, improved process control during the curing process of the plastic material is achieved.

The illustrative embodiments are not to scale and are not restrictive. Modifications are possible as a matter of routine skill.

LIST OF REFERENCE CHARACTERS

1 hollow core
2 fiber preform
3 mold
4, 5 mold parts
6 filling system
7 heating tubes
8 movement of upper mold
9 fiber-reinforced plastic component
10 cavity
11 closing unit
12 press table
13 press ram
14 actuating means
15 pressure measuring means
16 signal line
17 control/evaluation device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a fiber-reinforced plastic component, comprising the acts of:
    inserting a fiber preform which is disposed on a fluid-filled hollow core into a mold that has at least two mold parts;
    closing the mold, wherein the fiber preform and the fluid-filled hollow core are disposed in a mold cavity that is formed by the at least two mold parts;
    filling the mold cavity with a plastic material;
    curing the plastic material in the closed mold by heating the mold; and
    measuring an internal pressure in the mold during the curing and increasing a distance between the at least two mold parts if the internal pressure exceeds an upper threshold value.

2. The method according to claim 1 further comprising the act of regulating the internal pressure in the mold during the curing by changing the distance between the at least two mold parts.

3. The method according to claim 1, wherein the fluid-filled hollow core is closed in a fluid-tight manner during the curing.

4. The method according to claim 1, wherein the fluid-filled hollow core is closed permanently in a fluid-tight manner.

5. The method according to claim 2, wherein the distance between the at least two mold parts is varied in a range of from 0 to 4 mm during the curing.

6. The method according to claim 1, wherein the internal pressure is measured at one or more points of an inner wall facing the mold cavity of at least one of the at least two mold parts.

7. The method according to claim 1, wherein the fiber-reinforced plastic component is a vehicle component.

8. A device for producing a fiber-reinforced plastic component, comprising:
- a mold that has at least two mold parts; a fluid-filled hollow core;
- wherein the at least two mold parts are disposed in a closing unit by which the at least two mold parts are movable relative to each other between an open position and a closed position;
- wherein, in the closed position, the at least two mold parts enclose a cavity in which a fiber preform that is formed around the fluid-filled hollow core is arrangeable;
- an actuator via which a distance between the at least two mold parts is changeable by moving at least one of the at least two mold parts;
- a pressure measurement sensor via which an internal pressure in the cavity is detectable; and
- a control device, wherein the actuator is actuatable by the control device and wherein the control device via the actuator increases the distance between the at least two mold parts if a measured internal pressure in the cavity exceeds an upper threshold value.

9. The device according to claim 8, wherein the control device controls the actuator such that the internal pressure in the cavity is regulated in accordance with the measured internal pressure in the cavity by changing the distance between the at least two mold parts.

* * * * *